Patented Oct. 15, 1929

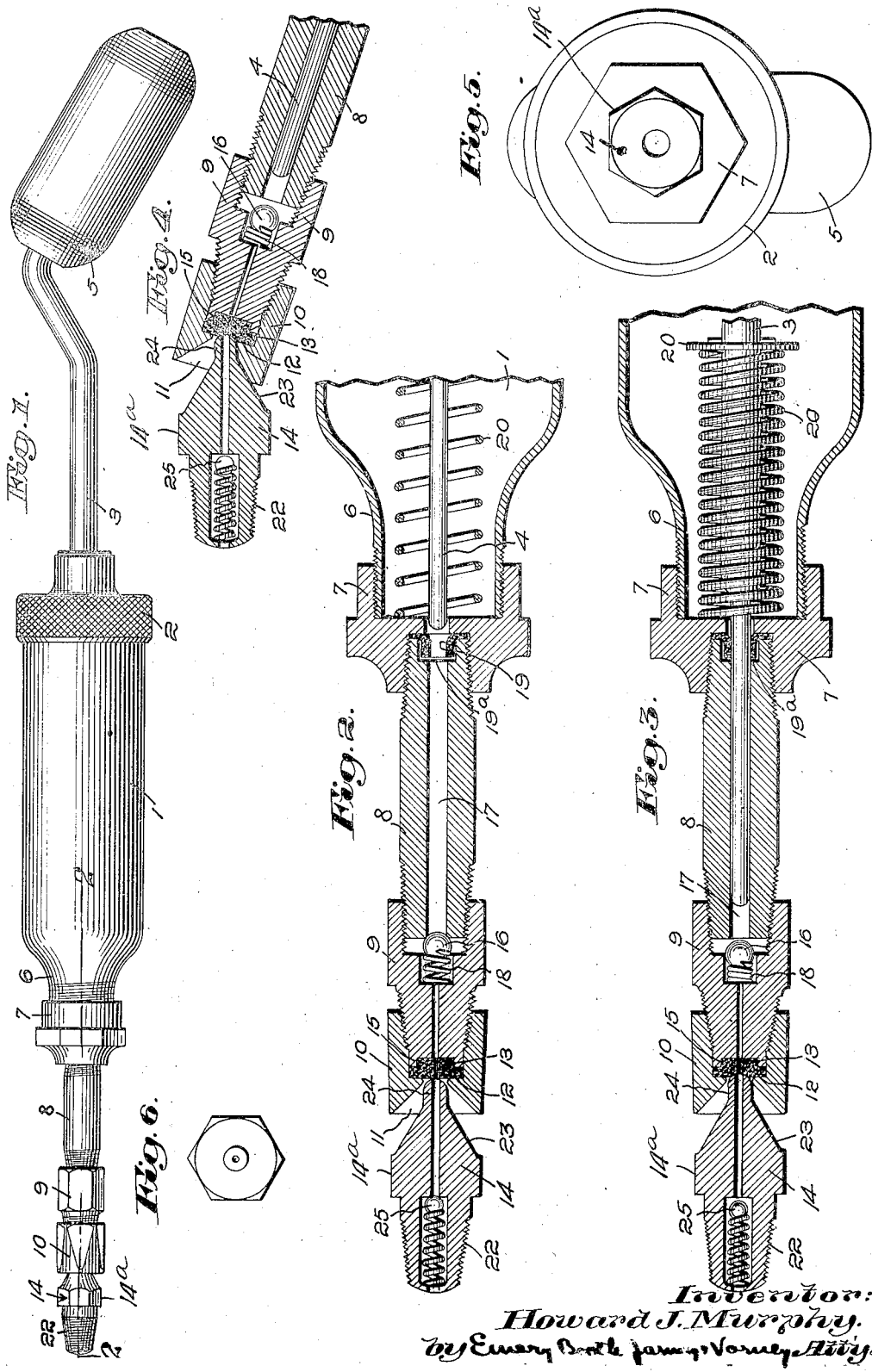

1,731,635

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING APPARATUS

Application filed July 22, 1925. Serial No. 45,299.

This invention aims to provide improvements in lubricating apparatus.

In the drawings, which illustrate a preferred embodiment of my invention:—

Figure 1 is a side elevation of a lubricant-expelling device engaging a lubricant-receiving nipple;

Fig. 2 is a section on the line 2—2 of Fig. 1, being partly in elevation and showing the relation of the parts of the nipple and lubricant-expelling device prior to forcing lubricant therefrom;

Fig. 3 is a section similar to Fig. 2, but showing the relation of parts as the lubricant is being expelled from the device to the lubricant-receiving nipple;

Fig. 4 is a section showing a portion of the discharge end of the device angularly engaging a lubricant-receiving nipple;

Fig. 5 is a front elevation of the lubricant-expelling device; and

Fig. 6 is a front elevation of the preferred form of lubricant-receiving nipple.

Referring to the drawings, I have shown a lubricant-expelling device, which includes means for expelling lubricant to a lubricant-receiving nipple. With the device illustrated lubricant may be expelled therefrom under relatively high potential pressure without the use of interengaging coupling means on the nipple and in the end of the device. The drawings illustrate a lubricant-expelling gun which includes a supply barrel 1, having a rear head 2, which supports and guides a plunger stem 3 carrying a plunger 4 of relatively small cross-sectional area normally within the barrel 1 and a handle 5. At the discharge end of the gun, I have provided a reduced portion 6 carrying a front head 7 interiorly threaded to receive an intermediate part 8.

A valve-carrying part 9 is threadedly secured to the outer end of the intermediate part and a nozzle part 10 is threadedly secured to the valve-carrying part as best illustrated in Figs. 2 and 3.

The nozzle part 10 presents a tapered orifice 11 at its outer end, a shoulder 12 within the nozzle end carries a packing 13 of leather, or other flexible material, suitable for providing a seal against the end of the lubricant-receiving nipple 14 more fully hereinafter described. The packing is formed in a single piece and is gripped tightly between the shoulder 12 and the end of the valve-carrying part 9. The valve-carrying part is recessed at its outer end to permit a portion of the packing or sealing part 13 to fit into the recess 15 without being compressed to any great extent, thereby permitting the lubricant to work behind the sealing part for the purposes hereinafter described.

The valve-carrying part 9 is also recessed at its inner end to carry a ball check 16 normally seated against one end of the intermediate part 8 which has a bore or chamber 17 of relatively small cross-sectional area. The ball check 16 is urged against its seat by a spring 18, thereby closing the outer end of the chamber 17, as shown in Fig. 2.

Between the inner end of the intermediate part 8 and the front head 7, I have provided a hatshaped sealing washer 19 which extends into a recess 19ª in the end of the intermediate part 8. This hatshaped washer intersects the chamber 17 to engage the plunger 4. An annular chamber surrounds the plunger-engaging part of the washer so that the lubricant may press against the outer surface of the cylindrical wall of the washer and form a lubricant-pressed seal to prevent leakage of lubricant from the chamber 17 to the barrel 1 around the plunger when it passes the washer 19 to create high pressure, as illustrated in Fig. 3.

Normally the free end of the plunger extends slightly into an aperture in the front head 7, but the aperture at this point is just sufficiently larger in diameter than the piston 4 to provide a space around the end of the piston through which the lubricant may flow relatively freely from the barrel 1 to the chamber 17 while still guiding the front end of the piston to the hat washer 19. The end of the displacing piston provides a tapered surface free of any sharp edges which might cut or cause abrasion of the hat washer during entrance of the piston therethrough.

A relatively stiff spring 20 is interposed between the front head 7 and a metal washer 21 (Fig. 3) secured to the plunger stem 3, for the purpose of returning the plunger 4 to its normal position.

The lubricant-securing nipple 14 illustrated in the drawings is formed from a single piece of metal and presents a flat-sided central portion 14$^a$ to receive a wrench for attaching the nipple to a bearing. Beyond the central portion, I have provided a threaded portion 22, which may be threaded into a bearing, and at the front end of the nipple I have provided the tapered portion 23. This tapered portion starts at the central portion and gradually diminishes to a relatively small portion 24 having a rounded end adapted to seat against the sealing part 13 carried by the nozzle 10.

The nozzle 14, the packing 13 and the valve-carrying part 9 are all provided with passages of very small cross-sectional area. The passage in the nipple 14 is normally closed by a spring-pressed check valve 25 adapted to be opened by the lubricant when the passages of the gun communicate with the passage in the nipple 14, as hereinafter more fully described.

Engagement of the gun with the nipple 14 is effected by placing the nozzle 10 over the nipple, so that the portion 24 is guided into the small end of the orifice 11 where it seats against the packing 13 as shown in Fig. 2. If then, pressure be exerted upon the handle 5, toward the nipple, the plunger 4 will be forced into the chamber 17 through the sealing washer 19 thereby forcing the lubricant from the chamber 17 under relatively high potential pressure. The lubricant forces open the check valve at the end of the chamber and flows through the needle-sized passages in the valve part and packing 13 into the nipple 14. As is illustrated in Fig. 3, some of the lubricant works its way back of the sealing part 13 and forces it very tightly against the rounded end of the nipple thereby forming a lubricant cushion back of the leather and preventing the manual pressure exerted upon the device and transmitted to the sealing part 10 from forcing the head of the nipple a substantial distance into the leather. The pressure of the lubricant in the passage through the leather exerted laterally, keeps the hole open and opposes crushing of the leather by the head of the nipple.

By providing the hatshaped sealing part 19, lubricant may be expelled from the device under a relatively greater potential pressure than has heretofore been possible with other known devices for similar use having approximately the same proportions. This is possible because the hatshaped sealing washer 19 prevents reduction of pressure through leakage of lubricant from the chamber 17 to the barrel 1 when lubricant is being forced to the lubricant-receiving nipple.

The contact area between the end of the nipple and the packing 13 is confined to an area somewhat less than that of the plunger 4, thereby assuring a greater combined longitudinal pressure exerted by the operator than the back pressure which would otherwise interfere with a tight seal between the end of the nipple and the nozzle 10. So long as pressure is exerted upon the handle 5, a tight seal is effected between the nipple and the gun.

Fig. 4 illustrates an important feature of the device inasmuch as it is possible to reach nipples which are so positioned that the gun cannot be even approximately aligned with the axis of the nipple. The gun may be operated very efficiently even when the axis of the gun is at a substantial angle relative to the nipple. This angular operation is possible because of the smallness of the portion 24 and its rounded end in combination with the tapered wall surrounding the orifice at the entrance of the nozzle 10 and the tapered shoulder 24 of the nipple. The tapered parts, as above described, permit the gun to tip about the rounded end of the portion 24 in any direction until the wall of the nozzle engages the wall of the tapered portion 24, thereby providing a stop.

The openings in the packing and in the nipple are in communication at any time the nozzle is engaged with the nipple. This is true whether the axis of the gun is aligned with the nipple or is at an angle relative thereto and a push on the handle 5 will cause a tight seal between the nipple and the gun and force lubricant to the nipple even when the angle is as great as that illustrated in Fig. 4.

In ordinary operation of the device, the chamber 17 will fill each time the nozzle is drawn away from the nipple 14, so that when the device is again urged into engagement with a nipple, lubricant is forced to the nipple under high potential pressure. The actual pressure exerted will depend upon the resistance opposing the expulsion of lubricant from the chamber 17.

While I have shown and described a preferred embodiment of my invention, it will be understood that changes involving omission, alteration, substitution and reversal of parts, and even changes in the mode of operation, may be made without departing from the scope of my invention, which is best defined in the following claims.

I claim:

1. A lubricant-expelling device comprising, in combination, a supply barrel, a chamber aligned with said barrel having a cross-sectional area substantially smaller than said barrel, a nozzle beyond said barrel for engagement with a lubricant-receiving nipple, a push-operated plunger adapted to be forced into said chamber to discharge lubricant therefrom and a combined lubricant-pressed sealing and valve part for surrounding said plunger thereby to prevent leakage of lubricant from said chamber when said plunger is moved into said chamber but permitting such leakage upon withdrawal of said plunger from said chamber.

2. A lubricant-expelling device comprising, in combination, a supply barrel, a chamber aligned with said barrel having a cross-sectional area substantially smaller than said barrel, a nozzle beyond said barrel for engagement with a lubricant-receiving nipple, a push-operated plunger adapted to be forced into said chamber to discharge lubricant therefrom, a hat-shaped combined sealing washer and valve circumferentially engaging said plunger while it is being forced into said chamber but permitting leakage while it is being withdrawn therefrom and an annular space around said washer to permit lubricant to force said washer tightly against said plunger thereby permitting expulsion of lubricant from said chamber under a relatively high potential pressure without leakage around said plunger.

3. A lubricant-expelling device comprising, in combination, a supply barrel, a chamber aligned with said barrel having a cross-sectional area substantially smaller than said barrel, a nozzle beyond said barrel for engagement with a lubricant-receiving nipple, a push-operated plunger having its free end normally adjacent the end of said chamber which communicates with said barrel to permit free flow of lubricant into said chamber and a lubricant-pressed sealing washer and valve beyond the end of said plunger and intersecting said chamber for engagement with said plunger to prevent re-passage of lubricant from said chamber to said barrel when said plunger is forced into said chamber to force lubricant to a lubricant-receiving nipple against which said nozzle contacts, but permitting such re-passage upon withdrawing said plunger from said cylinder.

4. A lubricant compressor comprising a barrel, a discharge nozzle having a chamber in alignment with said barrel, an outwardly opening check valve at the outlet end of said chamber, a plunger reciprocable into the chamber in said nozzle, and a single valve and sealing means at the inlet end of said chamber, said means preventing the leakage of lubricant from said chamber to said barrel upon the lubricant-expelling stroke of said plunger but permitting such leakage upon the return stroke thereof.

In testimony whereof, I have signed my name to this specification.

HOWARD J. MURPHY.